United States Patent
Okada (10) Patent No.: US 8,462,225 B2
(45) Date of Patent: Jun. 11, 2013

(54) IMAGING APPARATUS AND IMAGING METHOD

(75) Inventor: Masao Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 12/886,351

(22) Filed: Sep. 20, 2010

(65) Prior Publication Data
US 2011/0069194 A1    Mar. 24, 2011

(30) Foreign Application Priority Data
Sep. 24, 2009   (JP) ................. 2009-219330

(51) Int. Cl.
*H04N 5/228* (2006.01)
*H04N 5/225* (2006.01)
*G06K 9/00* (2006.01)
*G06K 9/46* (2006.01)

(52) U.S. Cl.
USPC .............. 348/222.1; 348/208.14; 348/169; 382/117; 382/118; 382/190; 382/103

(58) Field of Classification Search
USPC ...... 348/222.1, 77, 78, 169, 208.14; 382/103, 382/104, 118, 190, 195, 117
See application file for complete search history.

(56) References Cited

U.S. PATENT DOCUMENTS

| | | | |
|---|---|---|---|
| 6,940,545 B1 * | 9/2005 | Ray et al. ................ | 348/222.1 |
| 8,031,970 B2 * | 10/2011 | Li et al. .................... | 382/282 |
| 2006/0204041 A1 * | 9/2006 | Hammoud et al. ........ | 382/107 |
| 2007/0025722 A1 * | 2/2007 | Matsugu et al. .......... | 396/263 |
| 2007/0195174 A1 * | 8/2007 | Oren ......................... | 348/222.1 |
| 2007/0296848 A1 * | 12/2007 | Terashima ................. | 348/345 |
| 2008/0101659 A1 * | 5/2008 | Hammoud et al. ........ | 382/118 |
| 2008/0238694 A1 * | 10/2008 | Ishida ....................... | 340/575 |

FOREIGN PATENT DOCUMENTS

| JP | 2006-163496 A | | 6/2006 |
|---|---|---|---|
| JP | 2006163496 A | * | 6/2006 |

* cited by examiner

*Primary Examiner* — Nhan T Tran
*Assistant Examiner* — Marly Camargo
(74) *Attorney, Agent, or Firm* — Carter, DeLuca, Farrell & Schmidt LLP (57) ABSTRACT

An imaging apparatus includes an imaging unit, a closed-eye detection unit configured to detect a face from an image captured by the imaging unit and to detect whether the detected face has closed eyes, and a control unit configured to determine whether to issue a warning about a captured image to be recorded according to a detection result detected by the closed-eye detection unit for the captured image to be recorded and a detection result detected by the closed-eye detection unit for a preview image captured before the image to be recorded is captured.

8 Claims, 7 Drawing Sheets

DISPLAY FRAME FOR CLOSED-EYE WARNING

FIG. 3B

DISPLAY TEXT FOR CLOSED-EYE WARNING

FIG. 5

IMAGING APPARATUS AND IMAGING METHOD

CROSS REFERENCE TO RELATED APPLICATIONS

This application claims priority to Japanese Patent Application No. 2009-219330 filed Sep. 24, 2009, which is hereby incorporated by reference herein in its entirety.

BACKGROUND OF THE INVENTION

1. Field of the Invention

The present invention relates to an imaging apparatus and an imaging method, and more particularly to a technique well adaptable to prevent an erroneous determination in which a person having narrow eyes is determined to have closed eyes, even if he/she opens his/her eyes.

2. Description of the Related Art

Japanese Patent Application Laid-Open No. 2006-163496 discusses an imaging apparatus that can record images while identifying an image having a person closing his/her eyes and an image in which there is no one closing his/her eyes. The imaging apparatus described above records an image in which there is no one closing his/her eyes as a successful image, while recording an image having a person closing his/her eyes as a failed image.

However, the imaging apparatus discussed in Japanese Patent Application Laid-Open No. 2006-163496 does not have a measure to the case in which a person having narrow eyes is erroneously determined to have closed eyes, even if he/she opens his/her eyes.

SUMMARY OF THE INVENTION

The present invention is directed to a technique of preventing a closed-eye warning from being issued although a person having narrow eyes opens his/her eyes.

According to an aspect of the present invention, an imaging apparatus includes an imaging unit, a closed-eye detection unit configured to detect a face from an image captured by the imaging unit and to detect whether the detected face has closed eyes, and a control unit configured to determine whether to issue a warning about a captured image to be recorded according to a detection result detected by the closed-eye detection unit for the captured image to be recorded and a detection result detected by the closed-eye detection unit for a preview image captured before the image to be recorded is captured.

According to another aspect of the present invention, an imaging apparatus includes an imaging unit, a closed-eye detection unit configured to detect a face from an image captured by the imaging unit and to detect whether the detected face has closed eyes, and a control unit configured to determine whether to perform re-capturing of an image to be recorded according to a detection result by the closed-eye detection unit for a captured image to be recorded and a detection result by the closed-eye detection unit for a preview image captured before the image to be recorded is captured.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
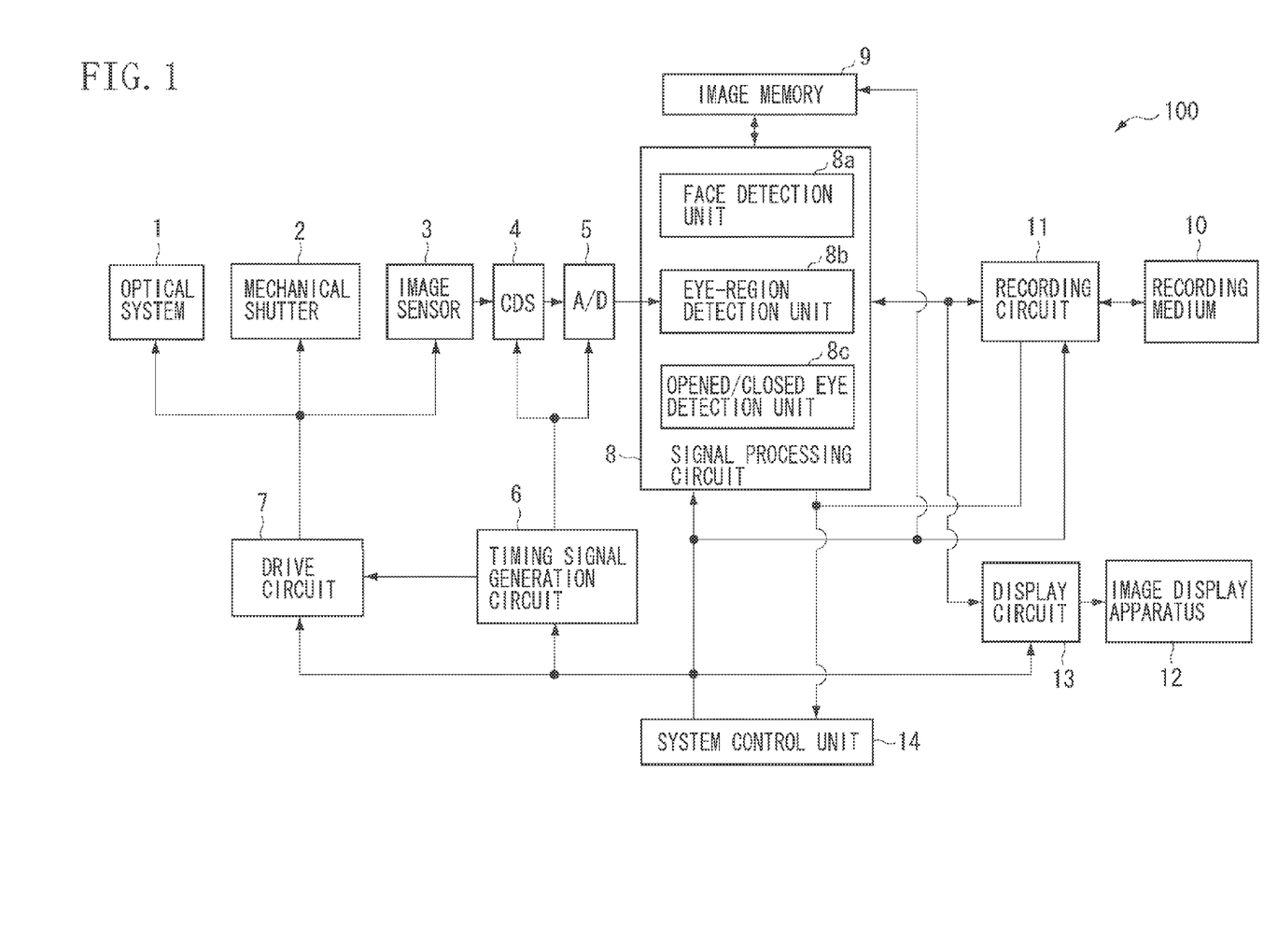
FIG. 1 is a block diagram illustrating a configuration of an imaging apparatus according to an exemplary embodiment of the present invention.

FIG. 1 is a block diagram illustrating a configuration of an imaging apparatus 100 according to an exemplary embodiment of the present invention.

In FIG. 1, an object image passing through an optical system 1 including a lens and a diaphragm is converted into an electric signal by an image sensor 3 including a photoelectric conversion element such as a charge-coupled device (CCD) or a complementary metal-oxide semiconductor (CMOS) sensor. A mechanical shutter 2 can block an object image from reaching the image sensor 3. A correlated double sampling (CDS) circuit 4 performs analog signal processing on image data generated by the image sensor 3, and an analog/digital (A/D) converter 5 converts an analog signal output from the CDS circuit 4 into a digital signal. A timing signal generation circuit 6 generates signals to control the image sensor 3, the CDS circuit 4, and the A/D converter 5. A drive circuit 7 controls the driving of the optical system 1, the mechanical shutter 2, and the image sensor 3. A signal processing circuit 8 performs various types of signal processing on the digital signal output from the A/D converter 5.

An image memory 9 is a volatile memory, and temporarily stores the image data that is subjected to the signal processing by the signal processing circuit 8. An image recording medium 10 is a non-volatile memory that stores a captured image. The image recording medium 10 can be attached to and detached from the imaging apparatus 100. A recording circuit 11 executes control to record the image data, which is subjected to the signal processing by the signal processing circuit 8, on the image recording medium 10. An image display apparatus 12 displays the image data that is subjected to the signal processing by the signal processing circuit 8. A display circuit 13 executes control to allow the image display apparatus 12 to display an image. A system control unit 14 controls the entire imaging apparatus 100.

A capturing operation in which the mechanical shutter 2 is used in the imaging apparatus 100 thus configured according to the present exemplary embodiment will be described below.

The optical system 1 drives the diaphragm and the lens according to a control signal from the system control unit 14 to form an object image, which is set to have a suitable brightness, on the image sensor 3. Then, the mechanical shutter 2 is driven, according to the control signal from the system control unit 14, to block the image sensor 3 from light with the operation of the image sensor 3 to have a necessary exposure time. In this case, when the image sensor 3 has a function of an electronic shutter, it may be used together with the mechanical shutter 2 to secure the necessary exposure time.

The image sensor 3 is driven with a drive pulse that is generated based on an operation pulse generated by the timing signal generation circuit 6, which is controlled by the system control unit 14. The image sensor 3 converts the object image into an electric signal through a photoelectric conversion, and outputs the resultant as an analog image signal. The analog image signal output from the image sensor 3 has a clock synchronization noise removed by the CDS circuit 4 according to the operation pulse generated by the timing signal generation circuit 6, which is controlled by the system control unit 14, and is then converted into a digital image signal by the A/D converter 5.

Then, image processing, such as a color conversion, white balance, and a gamma correction, resolution conversion processing, image compression processing, etc., is performed at the signal processing circuit 8. At the signal processing circuit 8, the digital image signal may be output to the image memory 9 or the recording circuit 11 as the image data, without performing signal processing according to the control signal from the system control unit 14. When a request is given from the system control unit 14, the signal processing circuit 8 outputs the digital image signal or the information of the image data, which are produced during the signal processing, to the system control unit 14. For example, the signal processing circuit 8 outputs information such as a spatial frequency of an image, an average value in a designated area, and a data amount of a compressed image, or information extracted from these factors to the system control unit 14. When a request is given from the system control unit 14, the recording circuit 11 outputs information on the type or the free area of the image recording medium 10 to the system control unit 14.

The reproducing operation when the image data is recorded on the image recording medium 10 will next be described.

The recording circuit 11 reads image data from the image recording medium 10 according to the control signal from the system control unit 14. When the image data is a compressed image, the signal processing circuit 8 performs image decompression processing according to the control signal from the system control unit 14, and stores the resultant into the image memory 9. The image data stored in the image memory 9 is subjected to the resolution conversion processing by the signal processing circuit 8, then, converted into a signal suitable for the image display apparatus 12 by the display circuit 13, and then, displayed on the image display apparatus 12.

The signal processing circuit 8 includes a face detection unit 8a, an eye-region detection unit 8b, and an opened/closed eye detection unit 8c, which are configured by a program. The face detection unit 8a has a function of detecting a person's face from a captured image by a face recognizing technique. When a plurality of persons are recorded in a captured image, the face detection unit 8a individually detects a plurality of face regions. The eye-region detection unit 8b detects the eye region where eyes are present from the face region detected by the face detection unit 8a. The opened/closed eye detection unit 8c determines whether the eyes in the eye region are opened or closed. For example, the opened/closed eye detection unit 8c detects the area of the region having the brightness corresponding to a black eye from a histogram in the eye region, and when the area of the region having the brightness corresponding to the black eye is lower than a threshold value set according to the size of the eye region, the opened/closed eye detection unit 8c determines that the eyes are closed.

Figure 2:
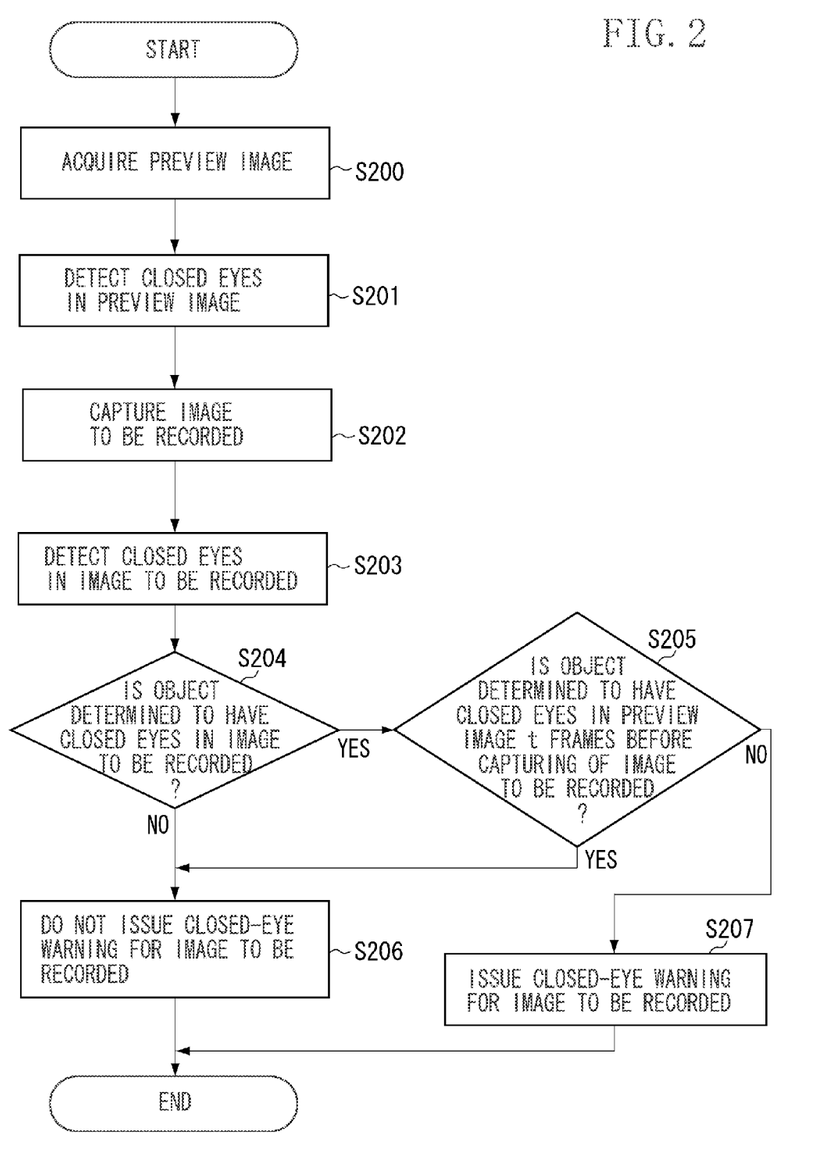
FIG. 2 is a flowchart illustrating an operation of the imaging apparatus according to a first exemplary embodiment of the present invention.

FIG. 2 is a flowchart illustrating a process operation of the imaging apparatus 100 according to a first exemplary embodiment of the present invention. The system control unit 14 executes the flowchart according to the program stored in a non-volatile storage medium (not illustrated) in the system control unit 14.

Firstly, the system control unit 14 starts an acquisition of a preview image in step S200. The preview image here is not an image that is captured to be recorded on the image recording medium 10 in FIG. 1, but a moving image displayed on the image display apparatus 12 via the image sensor 3 to allow a user to determine a composition or timing of capturing.

Next, in step S201, the signal processing circuit 8 continuously executes a closed-eye detection in the acquired preview image. The cycle of the closed-eye detection is determined by a time required for a series of processing by the face detection unit 8a, the eye-region detection unit 8b, and the opened/closed eye detection unit 8c. When the capturing of an image to be recorded is instructed through the user's operation on the shutter button (not illustrated), the system control unit 14 instructs the capturing of the image to be recorded in step S202. Then, in step S203, the signal processing circuit 8 performs the closed-eye detection in the captured image to be recorded.

In step S204, the system control unit 14 determines whether closed eyes are detected from an object in the image to be recorded. When an object that is determined to have closed eyes is not present as a result of the determination of the closed-eye detection (NO in step S204), the processing proceeds to step S206. In step S206, the system control unit 14 does not issue a closed-eye warning, which is described below. When the object that is determined to have closed eyes is present in step S204 (YES in step S204), the processing proceeds to step S205. In step S205, the system control unit 14 determines whether the object is also determined to have closed eyes in all preview images, i.e., from t frames before the capturing of the image to be recorded to the frame immediately before the capturing of the image to be recorded. When it is determined that the object is determined to have closed eyes in all preview images from t frames before the capturing of the image to be recorded to the frame immediately before the capturing of the image to be recorded as the result of the determination (YES in step S205), the processing proceeds to step S206. In step S206, the system control unit 14 does not the closed-eye warning for the user.

When the object is not determined to have closed eyes even in only one frame in the preview images from t frames before the capturing of the image to be recorded to the frame immediately before the capturing of the image to be recorded, or when the image to be recorded is captured before the lapse of t frames after the start of the acquisition of the preview image, the processing proceeds to step S207. In step S207, the system control unit 14 issues the closed-eye warning for the user. A predetermined value can experientially and appropriately be set to the value of the t frames in the above-mentioned description.

Figure 3A:
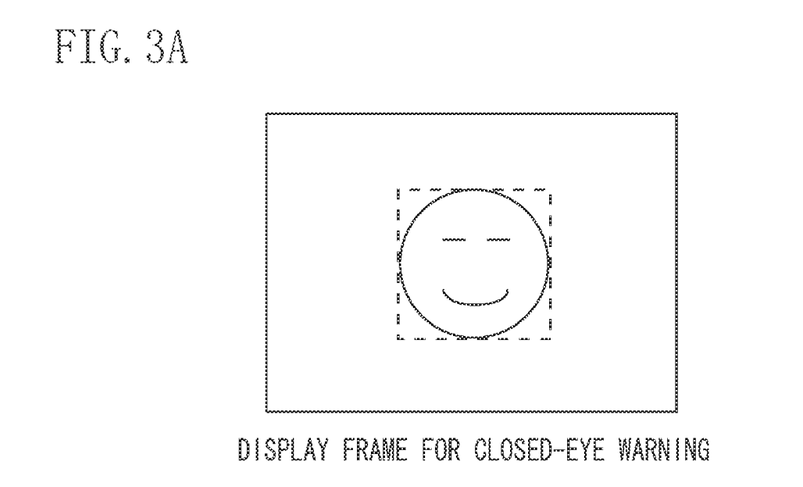
FIGS. 3A and 3B are views each illustrating an example of display of a closed-eye warning.
Figure 3B:
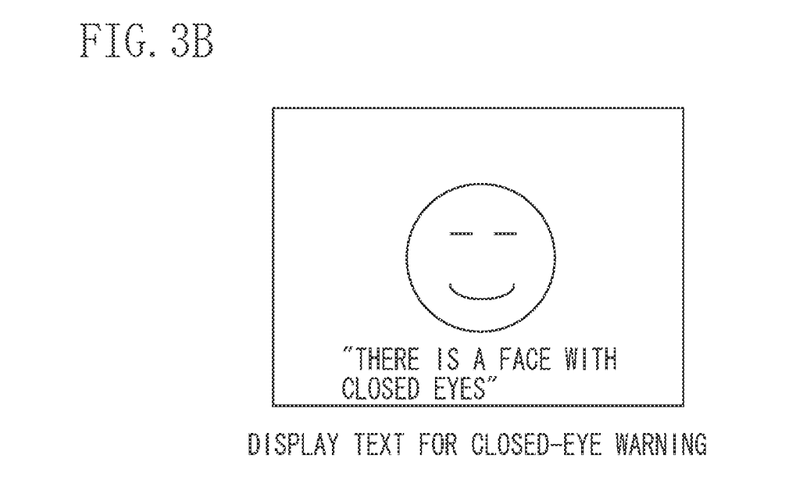

The closed-eye warning is issued such that the recorded image is reproduced and displayed on the image display apparatus 12 after the image to be recorded is captured, and the object that is determined to have closed eyes in the image is displayed with a warning frame as illustrated in FIG. 3A. Alternatively, the system control unit 14 gives to the user a warning of the presence of the object having closed eyes in the captured image by displaying a text, which indicates the presence of the object having closed eyes to the user, or by giving a voice or light such a light-emitting diode (LED), as illustrated in FIG. 3B.

The case in which the presence of the object having closed eyes is reported to the user by issuing the closed-eye warning in the present exemplary embodiment has been described. In addition to this, when the captured image is recorded on the image recording medium 10 as an Exif file, the information indicating that the object having closed eyes is present may be recorded onto a predetermined tag on the header portion of the Exif file. In the present exemplary embodiment, the case is described in which closed-eye determination is made from t frames before the capturing of the image to be recorded. However, the closed-eye determination may be made in all frames from the start of the preview image to the capturing of the image to be recorded.

The case is described in the present exemplary embodiment in which, even when an object determined to have closed eyes is present in a captured image to be recorded, the object is also determined to have closed eyes in a preview image t frames before the capturing of the image to be recorded. In this case, the closed-eye warning is not issued for the user. Thus, the trouble in which a person having narrow eyes, who opens his/her eyes, is erroneously determined to have closed eyes can be prevented.

Figure 4A:
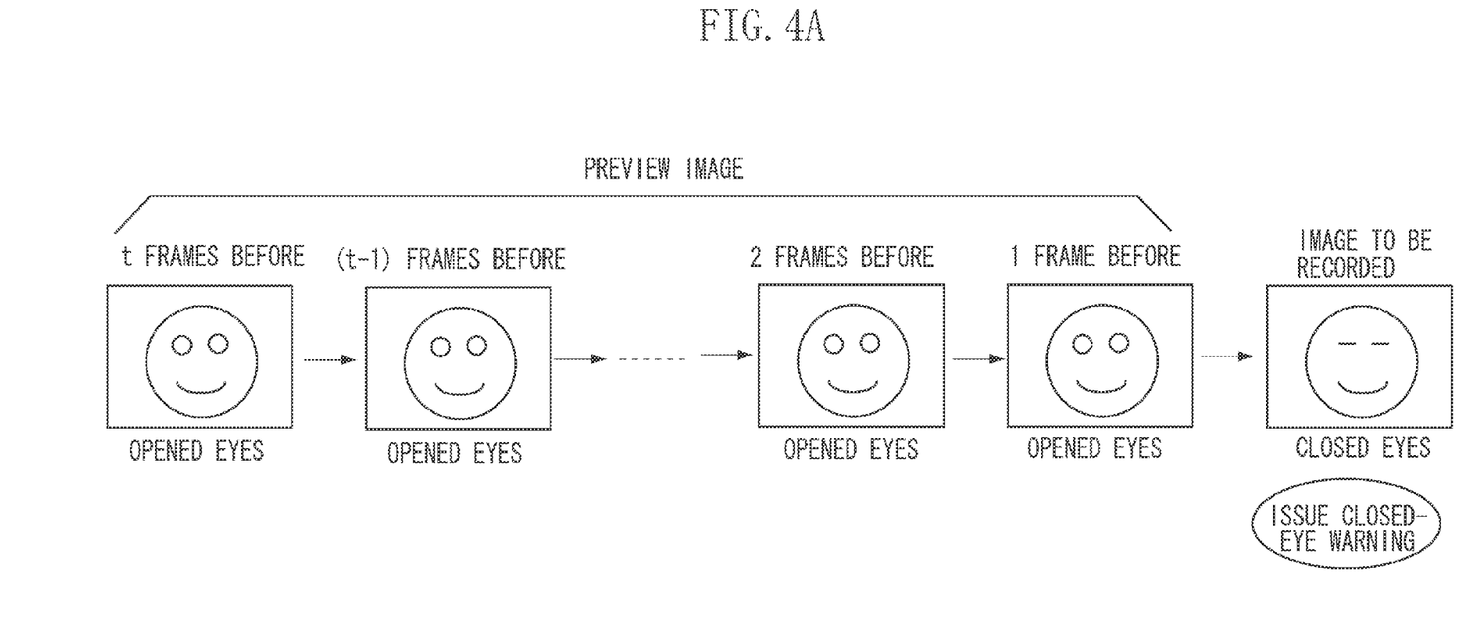
FIGS. 4A to 4C are views each illustrating an example of a pattern of a result of a closed-eye determination.
Figure 4B:
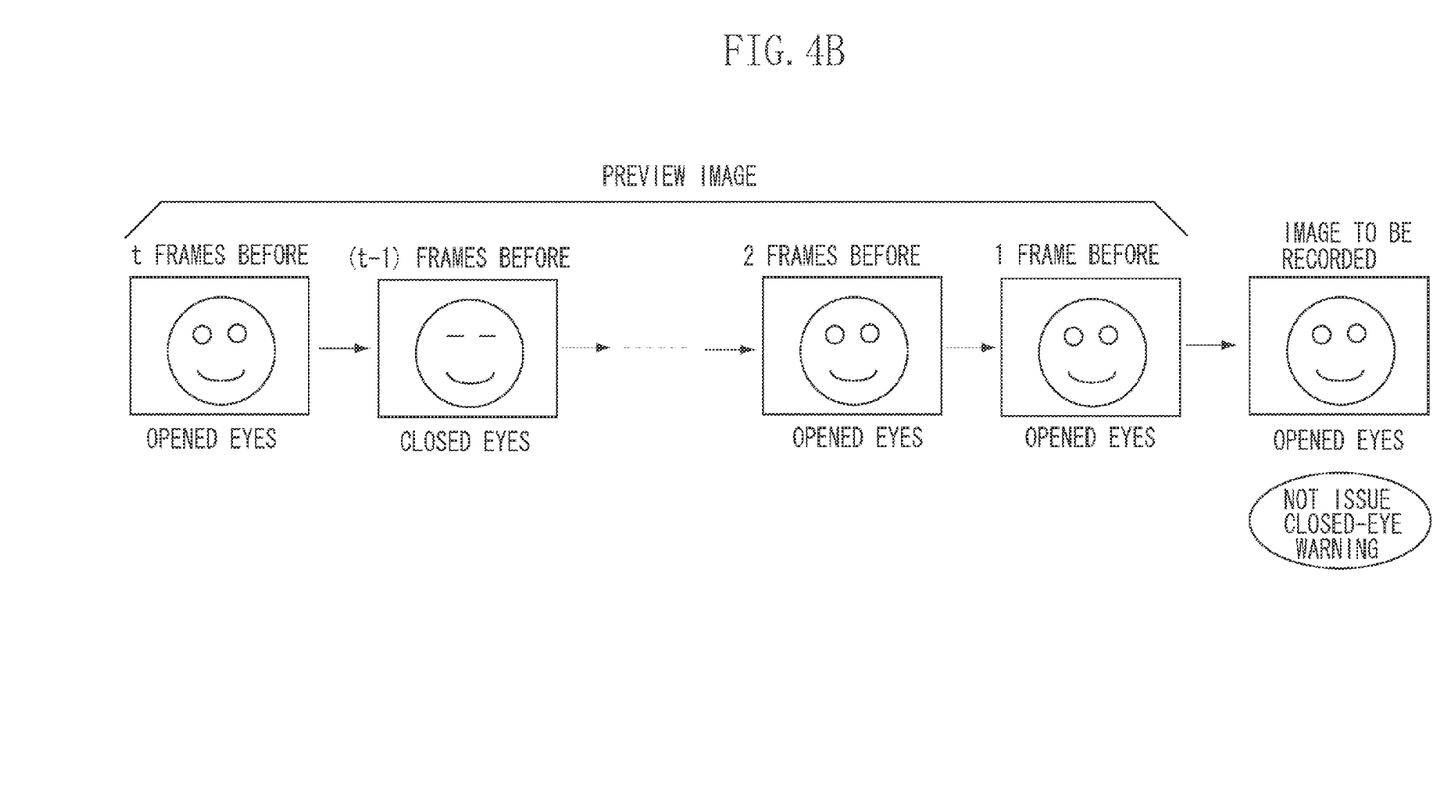
Figure 4C:
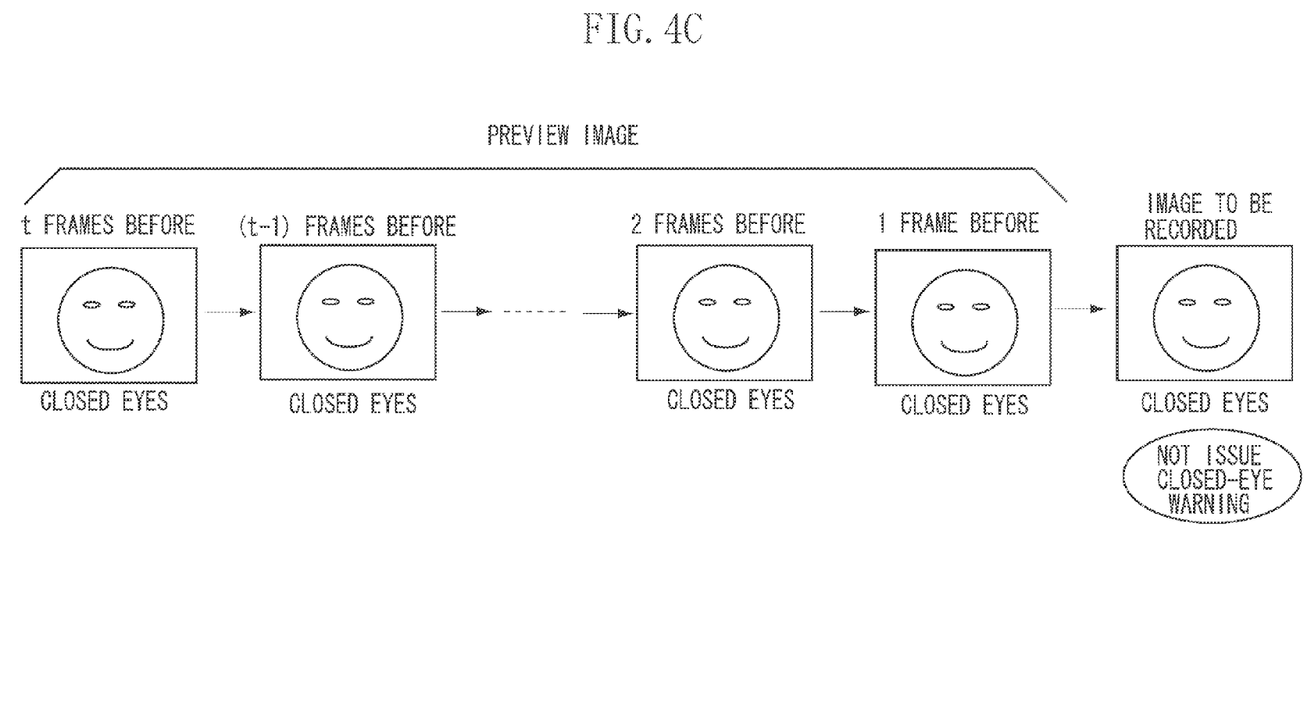

FIGS. 4A to 4C are views illustrating examples of patterns of the result of the closed-eye determination with the temporal transition of the preview image and the result of the closed-eye determination in the image to be recorded. In the conventional closed-eye detection, if an object is determined to have closed eyes as the result of the closed-eye determination for the image to be recorded, the closed-eye warning is issued, while if the object is determined not to have closed eyes, the closed-eye warning is not issued, without referring to the result of the closed-eye determination on the preview image.

Therefore, considering the conventional closed-eye detection, since the object in the image to be recorded is determined to have closed eyes, the closed-eye warning is issued in the pattern illustrated in FIG. 4A. Since the object in the image to be recorded is determined not to have closed eyes, the closed-eye warning is not issued in the pattern illustrated in FIG. 4B. A person having narrow eyes, who might be determined to have closed eyes even though he/she opens his/her eyes, is determined to have closed eyes in the image to be recorded as illustrated in FIG. 4C, so that the closed-eye warning might be issued in the conventional closed-eye detection.

In the case of the pattern illustrated in FIG. 4C, the imaging apparatus 100 according to the present exemplary embodiment determines that the object has closed eyes all the while from the preview image t frames before the capturing of the image to be recorded to the preview image immediately before the capturing of the image to be recorded. Therefore, as described above, the closed-eye warning is not issued even if the object in the image to be recorded is determined to have closed eyes. Accordingly, the imaging apparatus 100 according to the present exemplary embodiment can prevent the issue that the closed-eye warning is erroneously issued for a person who has narrow eyes and to whom the closed-eye warning should not be issued.

A second exemplary embodiment of the present invention will next be described.

In the present exemplary embodiment, when an object determined to have closed eyes is present in the image to be recorded, the image to be recorded is automatically re-captured. A schematic configuration of the imaging apparatus in the present exemplary embodiment is similar to that in the first exemplary embodiment, so that the block diagram illustrating the configuration is not illustrated.

Figure 5:
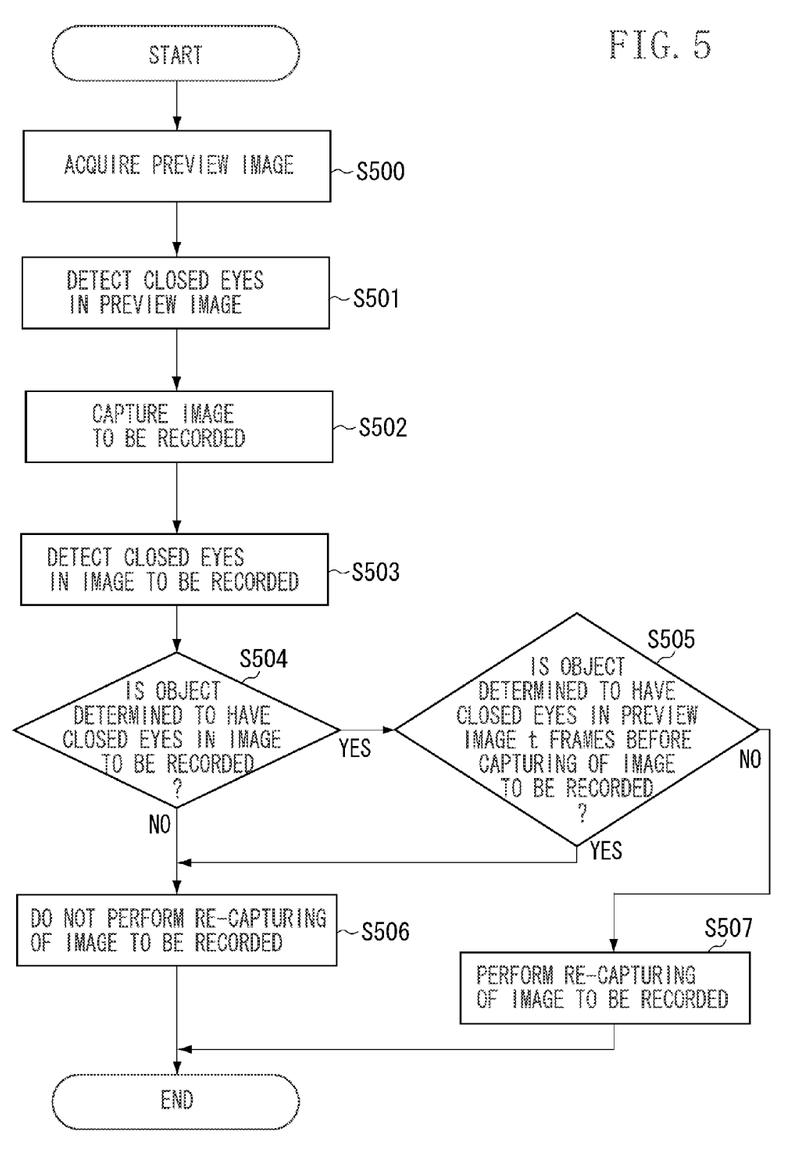
FIG. 5 is a flowchart illustrating an operation of the imaging apparatus according to a second exemplary embodiment of the present invention.

FIG. 5 is a flowchart illustrating a process operation of the imaging apparatus according to the second exemplary embodiment. Firstly, the system control unit 14 starts the acquisition of a preview image in step S500. Then, in step S501, the signal processing circuit 8 continuously executes a closed-eye detection on the acquired preview image. When the capturing of the image to be recorded is instructed through the user's operation on the shutter button (not illustrated), the system control unit 14 instructs the capturing of the image to be recorded in step S502. Then, in step S503, the signal processing circuit 8 executes the closed-eye detection on the captured image to be recorded. In step S504, the system control unit 14 determines whether closed eyes are detected from an object in the image to be recorded.

When the object that is determined to have closed eyes is not present as a result of the determination of the closed-eye detection (NO in step S504), the processing proceeds to step S506. In step S506, the system control unit 14 does not perform re-capturing. When the object that is determined to have closed eyes is present in step S504 (YES in step S504), the processing 14 proceeds to step S505. In step S505, the system control unit 14 determines whether the object is also determined to have closed eyes in all preview images, i.e., from t frames before the capturing of the image to be recorded to the frame immediately before the capturing of the image to be recorded. When it is determined that the object is determined to have closed eyes in all preview images from t frames before the capturing of the image to be recorded to the frame immediately before the capturing of the image to be recorded as the result of the determination (YES in step S505), the processing 14 proceeds to step S506. In step S506, the system control unit 14 does not perform re-capturing of the image to be recorded.

When the object is not determined to have closed eyes even in only one frame in the preview images from t frames before the capturing of the image to be recorded to the frame immediately before the capturing of the image to be recorded, or when the image to be recorded is captured before the lapse of t frames after the start of the acquisition of the preview image, the processing proceeds to step S507. In step S507, the system control unit 14 performs re-capturing of the image to be recorded. The re-capturing means here that the imaging apparatus automatically re-captures the image to be recorded to acquire an image of the object having opened eyes, when the object having closed eyes is present in the captured image to be recorded.

In the present exemplary embodiment, even when an object determined to have closed eyes is present in a captured image to be recorded, re-capturing is not performed when the object is also determined to have closed eyes in a preview image t frames before the capturing of the image to be recorded. Thus, the trouble in which a person having narrow eyes, who does not have to be re-captured, is re-captured by the erroneous determination, can be avoided.

In the above-described exemplary embodiments, the signal processing circuit 8 executes the closed-eye detection for all acquired preview images, but only the result of the closed-eye determination in the preview images after t frames before the capturing of the image to be recorded is reflected on the determination of the closed-eye warning or re-capturing. In view of this, only the preview images corresponding to the latest t frames may be stored in the image memory 9, and only when an object having closed eyes is detected from a captured image, the closed-eye detection is executed on the preview images stored in the image memory 9. With this configuration, the closed-eye detection for the preview images can be omitted when an object having closed eyes is not detected in the captured image. Further, the number of frames of the preview images that are the subject for the closed-eye detection can be reduced to a minimum. In this case, after the closed-eye detection for the captured image is executed, the closed-eye detection for the preview images is executed. Therefore, a longer time may be required for obtaining the result of the determination of the closed-eye warning or the re-capturing, compared to the case in which the closed-eye detection is executed on the preview image before the captured image is acquired.

In the above-described exemplary embodiments, the signal processing circuit 8 executes the closed-eye detection for the preview images in a predetermined number of frames. However, the signal processing circuit 8 may perform the closed-eye detection for the preview images in a number of frames corresponding to a predetermined number of seconds. The signal processing circuit 8 may also end the processing of the closed-eye detection when the closed eyes are detected in the preview image of any one of the frames in the predetermined number of frames, even though the closed-eye detection is not completed for the preview images in the predetermined number of frames.

The present invention can also be realized by executing the processing described below. Specifically, software (computer program) realizing the function of the above-mentioned exemplary embodiments is supplied to a system or an apparatus via a non-volatile storage medium storing the software. The system or a computer (central processing unit (CPU) or micro processing unit (MPU)) of the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus comprising:
an imaging unit;
a closed-eye detection unit configured to detect a face from an image captured by the imaging unit and to detect whether the detected face has closed eyes; and
a control unit configured to determine whether to issue a warning about a captured image to be recorded according to a detection result detected by the closed-eye detection unit for the captured image to be recorded and a detection result detected by the closed-eye detection unit for a preview image captured before the image to be recorded is captured,
wherein, when closed eyes are detected in all frames, which are set beforehand, of preview images, before a point of time when the image to be recorded is captured, the control unit does not issue a closed-eye warning about the captured image to be recorded, and when closed eyes are not detected in any one of the frames and closed eyes are detected in the captured image to be recorded, the control unit issues the closed-eye warning about the captured image to be recorded.

2. An imaging apparatus comprising:
an imaging unit;
a closed-eye detection unit configured to detect a face from an image captured by the imaging unit and to detect whether the detected face has closed eyes; and
a control unit configured to determine whether to perform re-capturing of an image to be recorded according to a detection result by the closed-eye detection unit for a captured image to be recorded and a detection result by the closed-eye detection unit for a preview image captured before the image to be recorded is captured,
wherein, when closed eyes are detected in all frames, which are set beforehand, of preview images, before a point of time when the image to be recorded is captured, the control unit does not perform re-capturing of the image to be recorded, and when closed eyes are not detected in any one of the frames and closed eyes are detected in the captured image to be recorded, the control unit performs re-capturing of the image to be recorded.

3. A method for controlling an imaging apparatus, the method comprising:
executing a closed-eye detection for detecting a face from an image captured by an imaging unit and detecting whether the detected face has closed eyes; and
determining whether to issue a warning about a captured image to be recorded according to a result of the closed-eye detection for the captured image to be recorded and a result of the closed-eye detection for a preview image captured before the image to be recorded is captured,
wherein, when closed eyes are detected in all frames, which are set beforehand, of preview images, before a point of time when the image to be recorded is captured, the determining step does not issue a closed-eye warning about the captured image to be recorded, and, when closed eyes are not detected in any one of the frames and closed eyes are detected in the captured image to be recorded, the determining step issues the closed-eye warning about the captured image to be recorded.

4. A method for controlling an imaging apparatus, the method comprising:
executing a closed-eye detection for detecting a face from an image captured by an imaging unit and detecting whether the detected face has closed eyes; and
determining whether to perform re-capturing of an image to be recorded according to a result of the closed-eye detection for a captured image to be recorded and a result of the closed-eye detection for a preview image captured before the image to be recorded is captured,
wherein, when closed eyes are detected in all frames, which are set beforehand, of preview images, before a point of time when the image to be recorded is captured, the determining step does not perform re-capturing of the image to be recorded, and when closed eyes are not detected in any one of the frames and closed eyes are detected in the captured image to be recorded, the determining step performs re-capturing of the image to be recorded.

5. A non-transitory non-volatile storage medium storing a computer program for causing a computer to execute a method for controlling an imaging apparatus, the method comprising:
executing a closed-eye detection for detecting a face from an image captured by an imaging unit and detecting whether the detected face has closed eyes; and
determining whether to issue a warning about a captured image to be recorded according to a result of the closed-eye detection for the captured image to be recorded and a result of the closed-eye detection for a preview image captured before the image to be recorded is captured,
wherein, when closed eyes are detected in all frames, which are set beforehand, of preview images, before a point of time when the image to be recorded is captured, the determining step does not issue a closed-eye warning about the captured image to be recorded, and, when closed eyes are not detected in any one of the frames and closed eyes are detected in the captured image to be recorded, the determining step issues the closed-eye warning about the captured image to be recorded.

6. A non-transitory non-volatile storage medium storing a computer program for causing a computer to execute a method for controlling an imaging apparatus, the method comprising:

executing a closed-eye detection for detecting a face from an image captured by an imaging unit and detecting whether the detected face has closed eyes; and determining whether to perform re-capturing of an image to be recorded according to a result of the closed-eye detection for a captured image to be recorded and a result of the closed-eye detection for a preview image captured before the image to be recorded is captured, wherein, when closed eyes are detected in all frames, which are set beforehand, of preview images, before a point of time when the image to be recorded is captured, the determining step does not perform re-capturing of the image to be recorded, and when closed eyes are not detected in any one of the frames and closed eyes are detected in the captured image to be recorded, the determining step performs re-capturing of the image to be recorded.

7. An imaging apparatus comprising:

an imaging unit;

a closed-eye detection unit configured to detect a face from an image captured by the imaging unit and to detect whether the detected face has closed eyes; and a control unit configured to determine whether to issue a warning about a captured image to be recorded according to a detection result detected by the closed-eye detection unit for the captured image to be recorded and a detection result detected by the closed-eye detection unit for a preview image captured before the image to be recorded is captured, wherein, when closed eyes are detected in the preview image, before a point of time when the image to be recorded is captured, the control unit does not issue a closed-eye warning about the captured image to be recorded, and when closed eyes are not detected in the preview image and closed eyes are detected in the captured image to be recorded, the control unit issues the closed-eye warning about the captured image to be recorded.

8. An imaging apparatus comprising:

an imaging unit;

a closed-eye detection unit configured to detect a face from an image captured by the imaging unit and to detect whether the detected face has closed eyes; and a control unit configured to determine whether to perform re-capturing of an image to be recorded according to a detection result by the closed-eye detection unit for a captured image to be recorded and a detection result by the closed-eye detection unit for a preview image captured before the image to be recorded is captured, wherein, when closed eyes are detected in the preview image, before a point of time when the image to be recorded is captured, the control unit does not perform re-capturing of the image to be recorded, and when closed eyes are not detected in the preview image and closed eyes are detected in the captured image to be recorded, the control unit performs re-capturing of the image to be recorded.

* * * * *